(12) United States Patent
She

(10) Patent No.: US 8,186,709 B2
(45) Date of Patent: May 29, 2012

(54) VEHICLE INTERIOR TRIM PANEL

(75) Inventor: Yimin She, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 182 days.

(21) Appl. No.: 12/722,304

(22) Filed: Mar. 11, 2010

(65) Prior Publication Data
US 2011/0221172 A1 Sep. 15, 2011

(51) Int. Cl.
B60R 21/213 (2011.01)
B60R 13/02 (2006.01)

(52) U.S. Cl. ............... 280/730.2; 296/1.02; 296/193.06; 264/271.1; 264/241; 264/279.1

(58) Field of Classification Search ............... 280/730.2, 280/728.1, 728.2, 728.3; 296/1.02, 193.06, 296/187.05, 191, 214; 264/271.1, 241, 257, 264/255, 259, 273, 274, 279.1
See application file for complete search history.

(56) References Cited

U.S. PATENT DOCUMENTS

| 5,931,525 | A  | * | 8/1999  | Rickabus      | 296/214   |
|-----------|----|---|---------|---------------|-----------|
| 7,651,143 | B2 | * | 1/2010  | Spamer        | 296/1.02  |
| 7,735,857 | B2 | * | 6/2010  | Hidaka et al. | 280/730.2 |
| 7,780,190 | B2 | * | 8/2010  | Yamagiwa et al. | 280/730.2 |
| 7,850,197 | B2 | * | 12/2010 | Zucal et al.  | 280/728.3 |
| 2001/0040361 | A1 | * | 11/2001 | Tajima et al. | 280/728.2 |
| 2002/0070484 | A1 | * | 6/2002  | Davis et al.  | 264/572   |
| 2002/0190507 | A1 | * | 12/2002 | Sante et al.  | 280/730.2 |
| 2005/0046160 | A1 | * | 3/2005  | Totani et al. | 280/730.2 |
| 2007/0052220 | A1 | * | 3/2007  | Hidaka        | 280/730.2 |
| 2007/0080524 | A1 | * | 4/2007  | Kim           | 280/730.2 |
| 2009/0096193 | A1 |   | 4/2009  | Robins        |           |

FOREIGN PATENT DOCUMENTS

JP 2007050732 A * 3/2007

OTHER PUBLICATIONS

Information on Nissan 09 Model—Interior Grip Assist.

* cited by examiner

Primary Examiner — Paul N Dickson
Assistant Examiner — Keith Frisby
(74) Attorney, Agent, or Firm — Global IP Counselors, LLP

(57) ABSTRACT

A vehicle interior trim panel is provided with a rigid trim portion and a flexible trim portion. The rigid trim portion includes an assist grip opening. The flexible trim portion is attached to the rigid trim portion along an edge of the assist grip opening with the flexible trim portion at least partially covering the assist grip opening of the rigid trim portion.

32 Claims, 12 Drawing Sheets

VEHICLE INTERIOR TRIM PANEL

BACKGROUND

1. Field of the Invention

The present invention generally relates to a vehicle interior trim panel of a vehicle body structure. More specifically, the present invention relates to a vehicle interior trim panel having an assist grip handle projecting through the trim panel.

2. Background Information

Vehicle structures are continually being improved for passenger safety. Most vehicles now include one or more airbags. Typically, an airbag includes an inflatable member that when deployed creates a cushioning bag or cushioning curtain to protect a passenger or passengers during impact events. Airbags are often installed in pillar structures within certain vehicles. For example, an airbag is sometimes installed in an A-pillar of the vehicle such that when the airbag inflates a cushioning curtain is formed between the vehicle passenger and a door and/or a portion of an interior roof of the vehicle. Many vehicles include an assist grip handle to assist passengers in entering and exiting the vehicle. These assist grip handles are often mounted to portions of pillars and/or roof rails that are next to a door opening. Typically, the assist grip handles are securely mounted to metal structural elements of the vehicle body with fasteners that extend through apertures in trim panels. Trim panels are usually provided over the metal structural elements of the vehicle body with the assist grip handles projecting through the trim panels to provide an attractive appearance. When an airbag is installed beneath a trim panel with an assist grip handle projecting through the trim panel, the trim panel needs to easily release from the metal structural element of the vehicle body upon deployment of the airbag. The interface between the trim panel and the assist grip handle should be configured such that the assist grip handle does not obstruct the deployment of the airbag.

SUMMARY

In view of the state of the known technology, one aspect of the present invention is to provide an interface between a vehicle interior trim panel and an assist grip handle that desensitizes the gap condition between the vehicle interior trim panel and the assist grip handle while allowing the vehicle interior trim panel to easily release from the metal structural element of the vehicle body upon deployment of the airbag.

In order to carry out this aspect of the present invention, a vehicle interior trim panel is provided that mainly comprises a rigid trim portion and a flexible trim portion. The rigid trim portion includes an assist grip opening. The flexible trim portion is attached to the rigid trim portion along an edge of the assist grip opening with the flexible trim portion at least partially covering the assist grip opening of the rigid trim portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
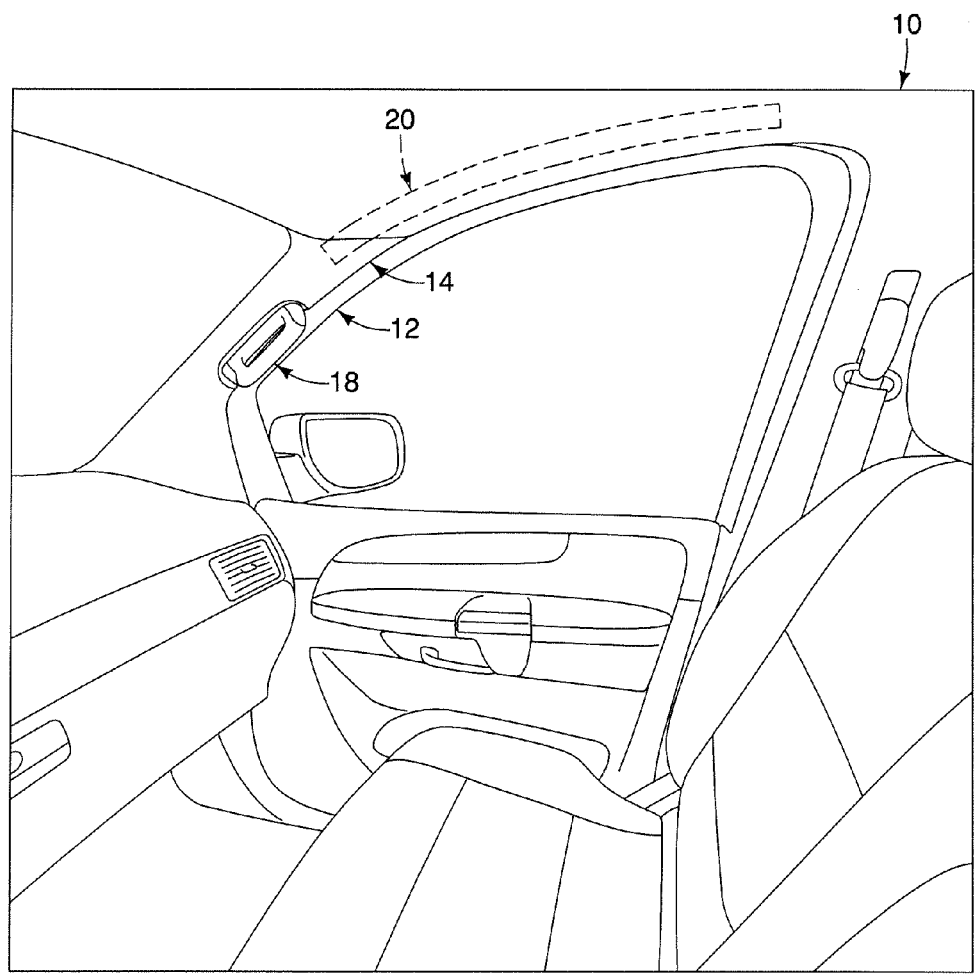
FIG. 1 is a perspective view of an interior portion of a vehicle that has a vehicle body structure with a vehicle interior trim panel and an assist grip handle in accordance with an illustrated embodiment.
Figure 2:
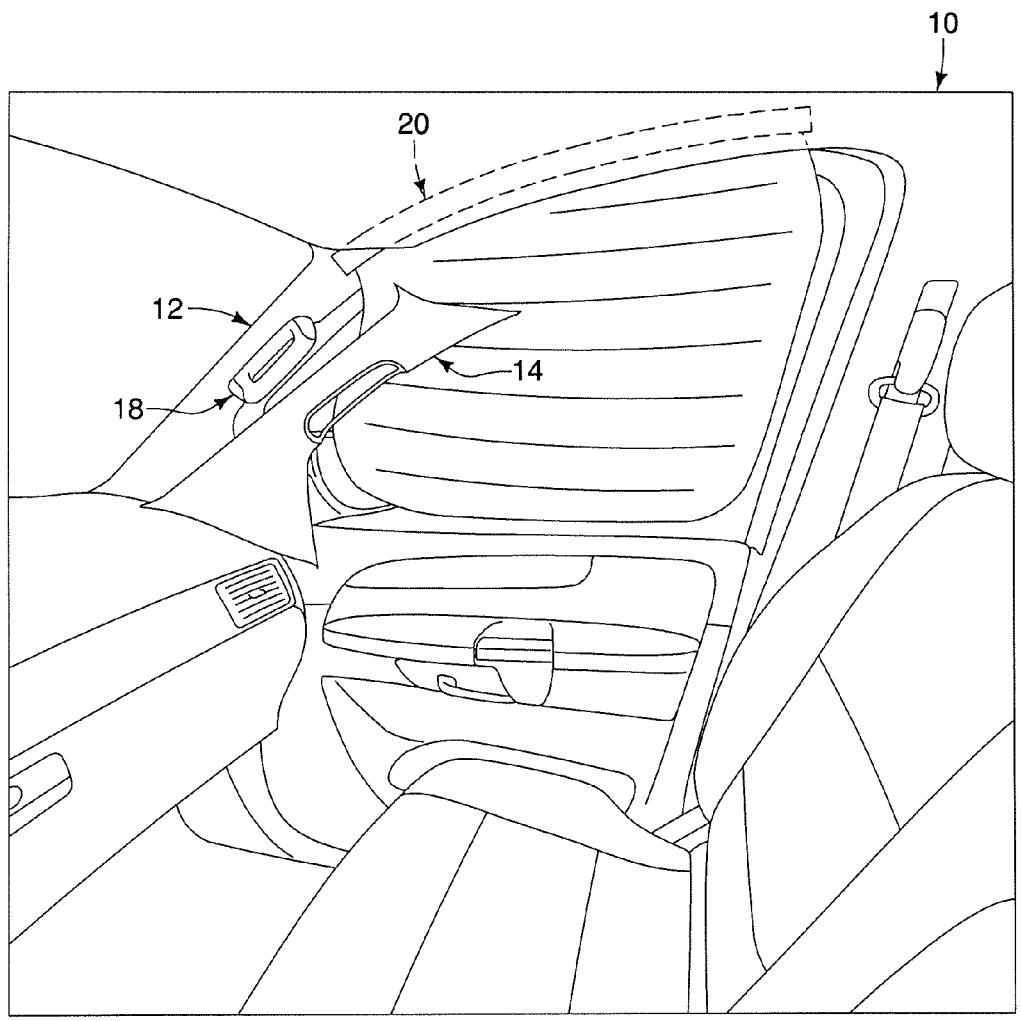
FIG. 2 is a perspective view of the interior portion of the vehicle illustrated in FIG. 1 with the airbag deployed and the vehicle interior trim panel in a detached position.

Referring initially to FIGS. 1 and 2, an interior portion of a vehicle 10 is illustrated that has a vehicle body structure 12 that includes a vehicle interior trim panel 14 in accordance with an illustrated embodiment. The vehicle body structure 12 further includes a pillar 16 and an assist grip handle 18. An airbag 20 is disposed between the vehicle interior trim panel 14 and the pillar 16. In the illustrated embodiment, the assist grip handle 18 is securely attached to the pillar 16, which constitutes a structural vehicle body section of the vehicle 10. The trim panel 14 covers the pillar 16, the airbag 20 and the connection of the assist grip handle 18 to the pillar 16. The assist grip handle 18 provides an assist grip that helps passengers get in and out of the vehicle 10. As shown in FIGS. 1 and 2, the pillar 16 is an A-pillar of the vehicle 10. Of course, the vehicle body structure 12 can be employed in other areas of the vehicle 10. The trim panel 14 is releasably secured to the pillar 16 such that the trim panel 14 moves away from the pillar 16 in response to deployment of a concealed airbag 20. In the illustrated embodiment, the assist grip handle 18 remains attached to the pillar 16 after deployment of the airbag 20.

Figure 3:
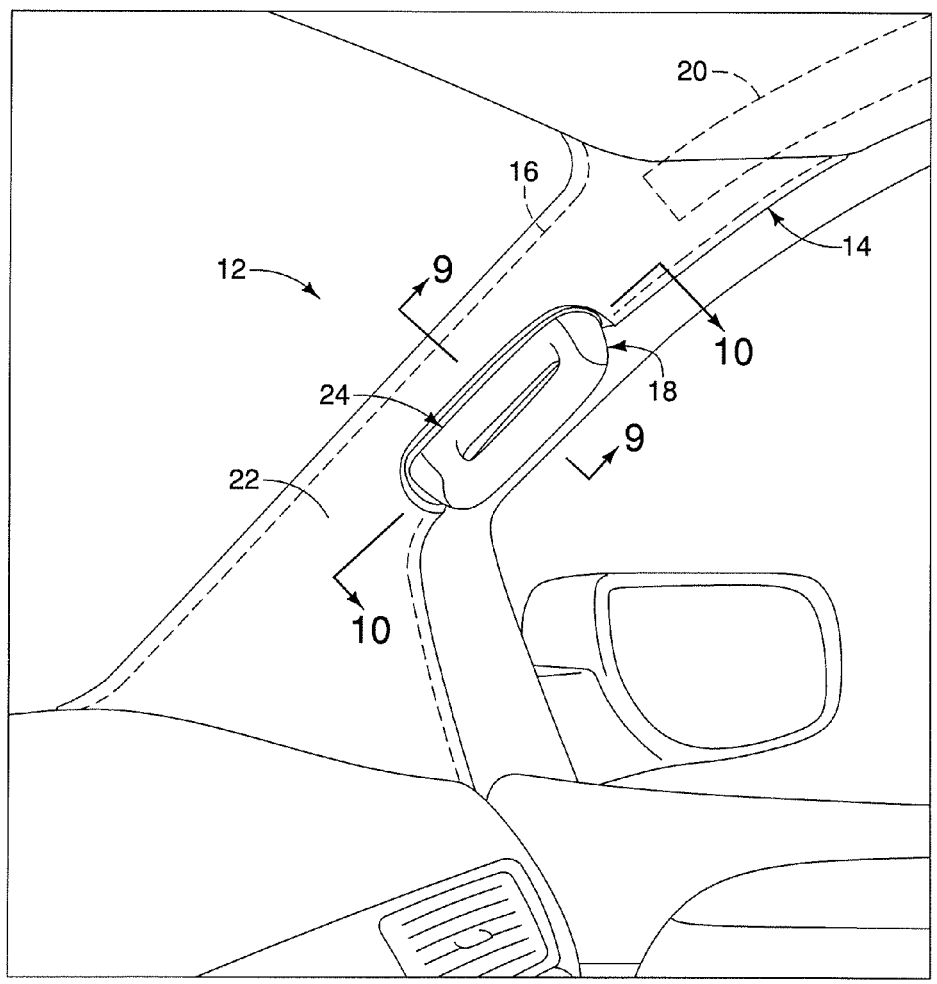
FIG. 3 is an enlarged elevational view of the A-pillar of the vehicle with the vehicle interior trim panel and the assist grip handle mounted on the A-pillar of the vehicle.
Figure 4:
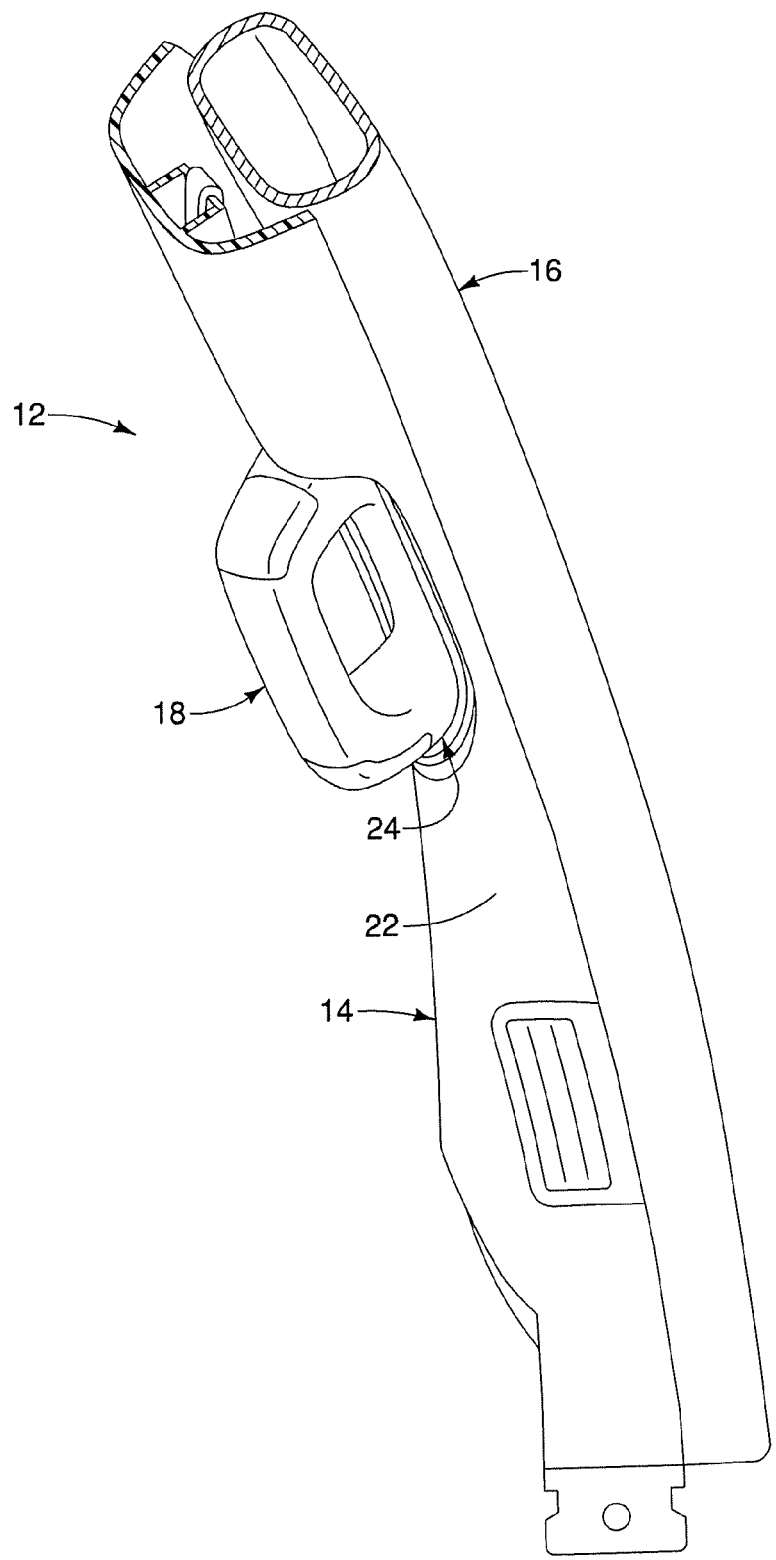
FIG. 4 is a rear elevational view of the A-pillar of the vehicle with the vehicle interior trim panel and the assist grip handle mounted on the A-pillar of the vehicle.

As seen in FIGS. 1, 3 and 4, the trim panel 14 is configured to overlay a portion of the pillar 16 and conceal the airbag 20. As seen in FIG. 2, the trim panel 14 is also configured to at least partially breakaway from the pillar 16 in response to deployment (inflation) of the airbag 20. In particular, the trim panel 14 moves away from the pillar 16 by a sufficient distance away from the pillar 16 to allow full deployment of the airbag 20. In the illustrated embodiment, the trim panel 14 is restrained from moving away from the pillar 16 by no more than a predetermined distance as mentioned below.

As seen in FIGS. 5 to 11, the trim panel 14 mainly includes a rigid trim portion 22 and a flexible trim portion 24. The rigid trim portion 22 has an overall peripheral configuration of a pillar trim panel that covers the pillar 16. With the rigid trim portion 22 secured to the pillar 16, the flexible trim portion 24 contacts the assist grip handle 18 to fill any gap occurring in the interface between the assist grip handle 18 and the rigid trim portion 22. In other words, the flexible trim portion 24 constitutes a grip assist gap hider that covers the gap between the rigid trim portion 22 and the assist grip handle 18. In the illustrated embodiment, the assist grip handle 18 has an assist grip bezel 26. The flexible trim portion 24 extends from the rigid trim portion 22 and contacts the assist grip bezel 26 to form a 360° seal between the rigid trim portion 22 and the assist grip bezel 26 of the assist grip handle 18.

Figure 7:
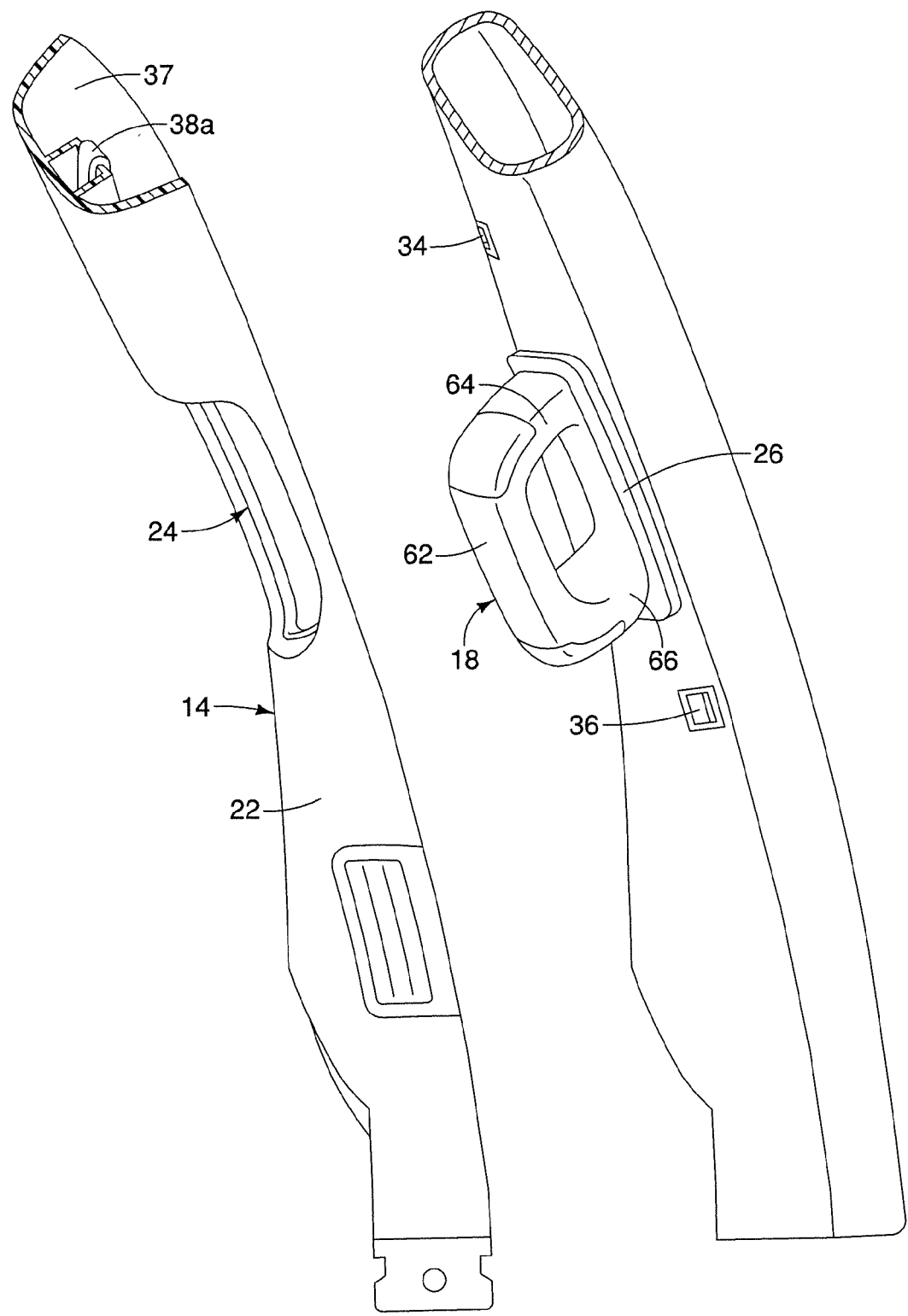
FIG. 7 is another exploded perspective view of the A-pillar of the vehicle with the vehicle interior trim panel and the assist grip handle mounted on the A-pillar of the vehicle.
Figure 8:
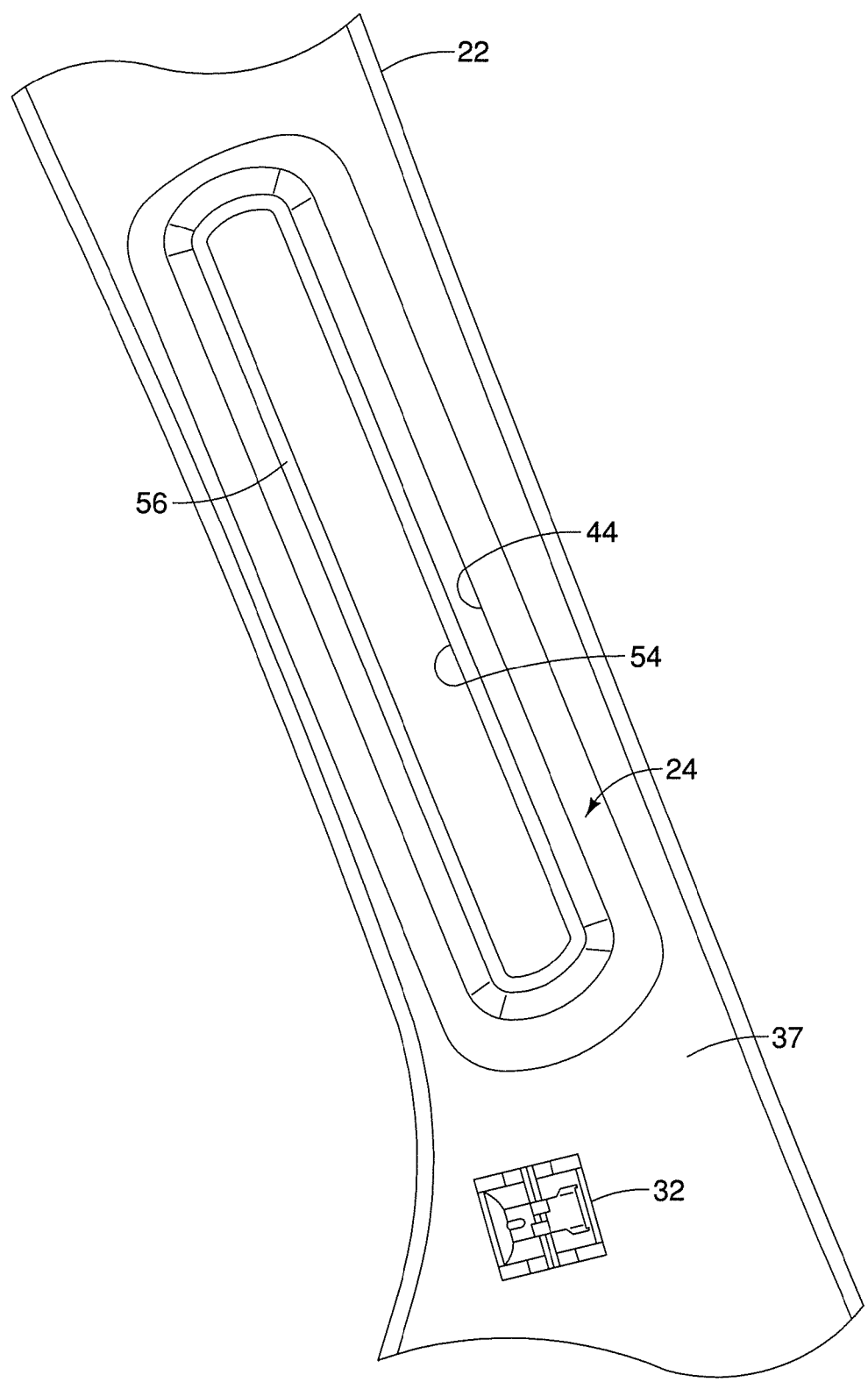
FIG. 8 is an enlarged perspective view of the hidden backside surface of the vehicle interior trim panel with the assist grip handle removed.
Figure 9:
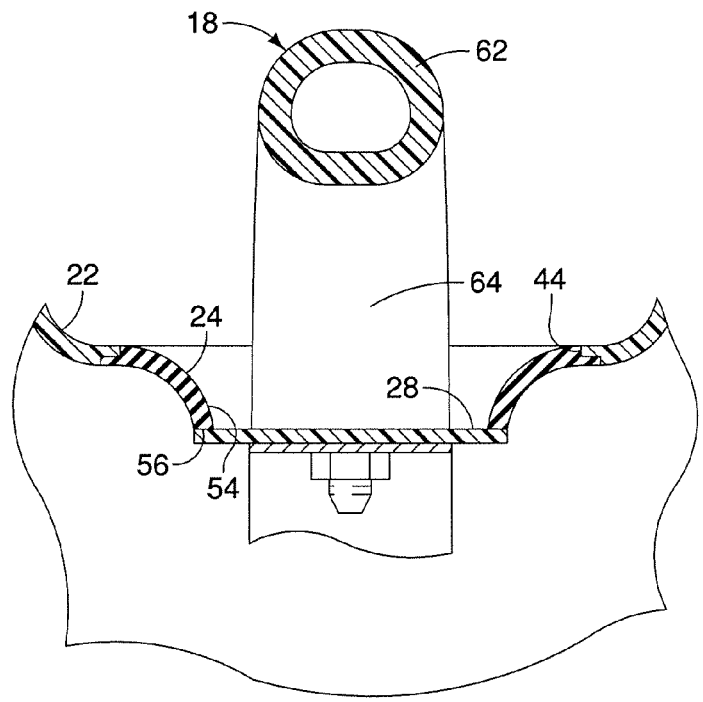
FIG. 9 is a cross sectional view of the vehicle interior trim panel and the assist grip handle as seen along section line 9-9 of FIG. 3.
Figure 10:
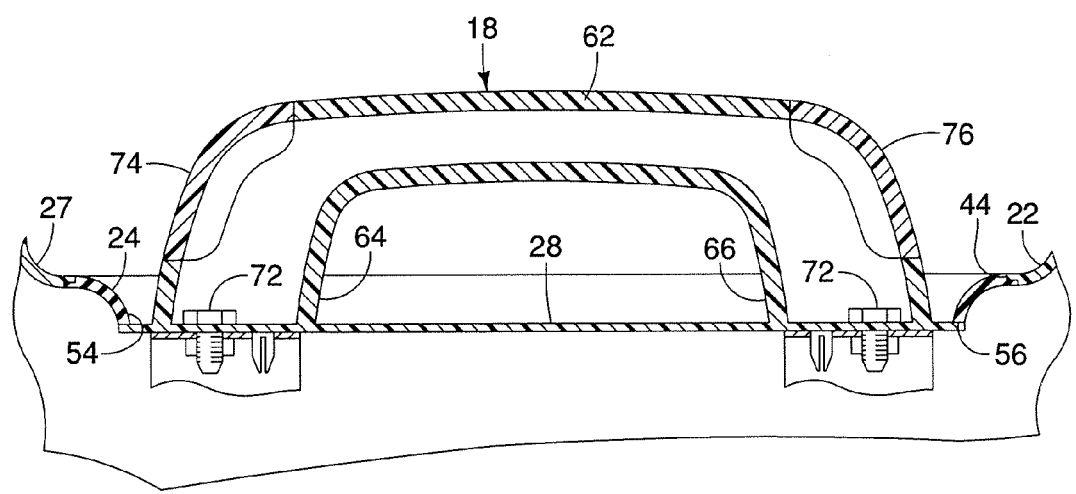
FIG. 10 is a cross sectional view of the vehicle interior trim panel and the assist grip handle as seen along section line 10-10 of FIG. 3.
Figure 11:
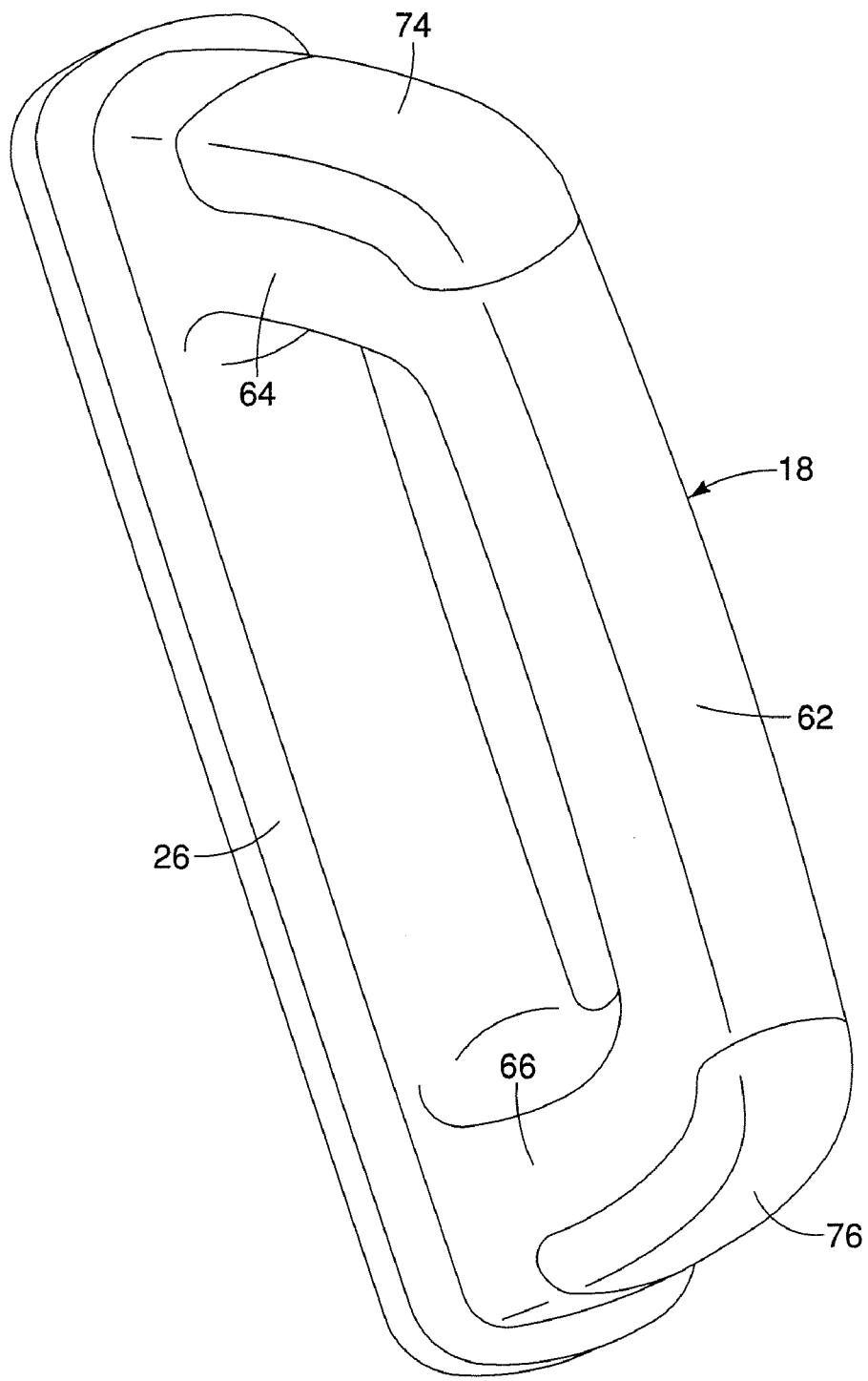
FIG. 11 is a perspective view of the assist grip handle showing the fasteners for attaching the bezel of the assist grip handle to the A-pillar of the vehicle.
Figure 12:
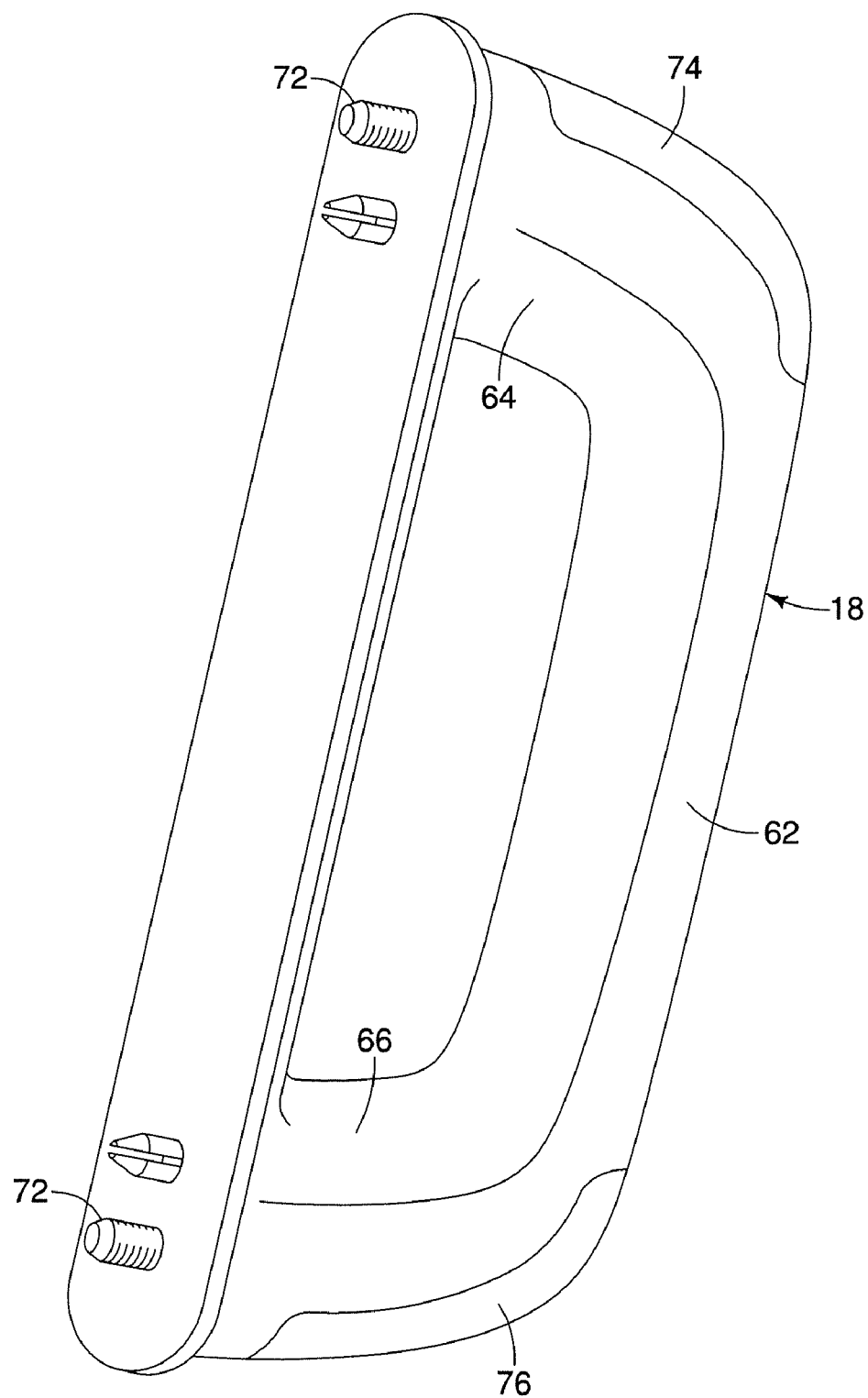
FIG. 12 is another perspective view of the assist grip handle showing the fasteners for attaching the assist grip handle to the A-pillar of the vehicle.
Figure 13:
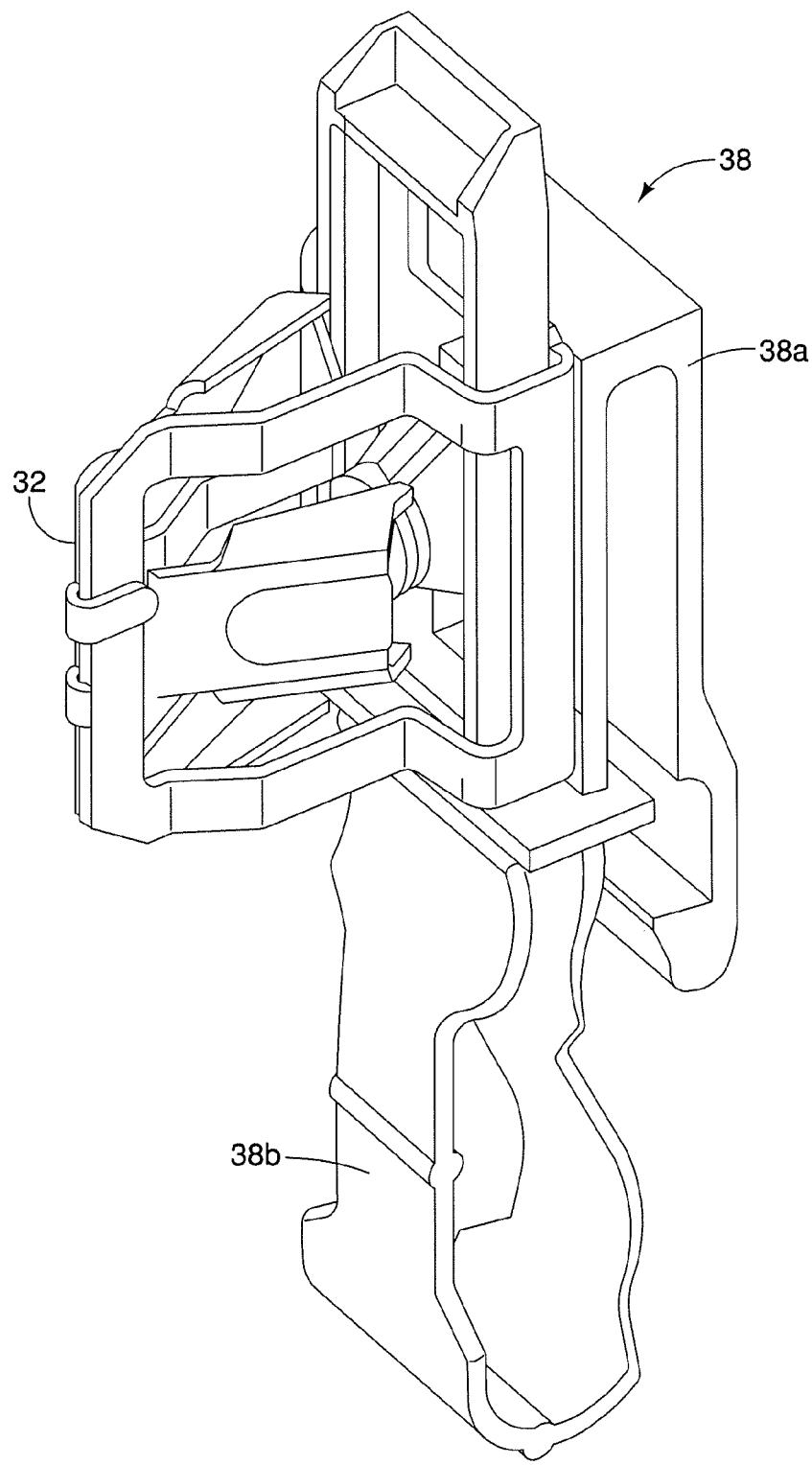
FIG. 13 is a perspective view of the integrated trim clip and tether connecting part of the vehicle interior trim panel.

As best can be seen in FIGS. 7 to 9, the rigid trim portion 22 of the trim panel 14 is releasably secured to the pillar 16 by a pair of trim clips 30 and 32. The trim clip 30 engages a clip mating part 34 via a snap-fit, while the trim clip 32 engages a clip mating part 36. In the illustrated embodiment, the trim clip 30 is attached to a hidden backside surface 37 of the rigid trim portion 22 by a tether part 38. Thus, as best seen in FIG. 13, the trim clip 30 and the tether part 38 form an integrated trim clip/tether. When the airbag 20 is deployed during a collision, the trim clip 30 separates from a base portion 38a of the tether part 38 so that a loop portion 38b of the tether part 38 can unfold. In other words, during deployment of the airbag 20, the trim clip 30 remains attached to the pillar 16 and the base portion 38a of the tether part 38 remains attached to the hidden backside surface 37 of the rigid trim portion 22. However, the trim clip 30 also remains connected to the base portion 38a of the tether part 38 by the loop portion 38b of the tether part 38 which has unfolded to allow the trim panel 14 to move away from the pillar 16 by no more than a predetermined distance. The trim clip 32 is directly attached to the rigid trim portion 22 of the trim panel 14. The trim clips 30 and 32 are conventional clips that release from the clip mating parts 34 and 36 upon an application of a prescribed releasing force. When the airbag 20 is deployed, the airbag 20 applies a force that is greater than the prescribed releasing force of the trim clips 30 and 32. Preferably, the trim clips 30 and 32 mate with the clip mating parts 34 and 36 in a reinstallable manner such that the trim panel 14 can be repeatedly removed and reinstalled without the trim clips 30 and 32 and/or the clip mating parts 34 and 36 becoming damaged.

Since trim clips and their clip mating parts are well known in the automotive field, the trim clips 30 and 32 and/or the clip mating parts 34 and 36 will not be illustrated and/or discussed in detail herein.

The rigid trim portion 22 is made of a thermoplastic polymer, such as polypropylene resin. The rigid trim portion 22 has a higher rigidity than the rigidity of the flexible trim portion 24. The term "rigid" as used herein does not require complete inflexibility, but rather the term "rigid" means self-supporting and maintaining its shape with or without a predetermined degree of flexibility. The rigid trim portion 22 includes a single assist grip opening 44 with the assist grip handle 18 projecting through the assist grip opening 44. The rigid trim portion 22 completely surrounds the assist grip opening 44 with the edge of the assist grip opening 44 being a continuous annular edge. The edge of the assist grip opening 44 is an elongated aperture that allows the trim panel 14 to be installed over the assist grip handle 18, which has been previously secured to the pillar 16. As discussed below, the assist grip handle 18 projects through the assist grip opening 44.

The flexible trim portion 24 is formed of an elastomer. For example, the flexible trim portion 24 is formed of a soft pliable material such as Santoprene™. In any event, the flexible trim portion 24 is more pliable than the rigid trim portion 22. In the illustrated embodiment, the rigid trim portion 22 and the flexible trim portion 24 are formed using an integrated two-shot molding method in which the rigid trim portion 22 is first molded and then the flexible trim portion 24 is molded directly onto the edge of the assist grip opening 44 of the rigid trim portion 22 using an integrated mold. In other words, in this method of forming the trim panel 14, the rigid trim portion 22 is first molded with the assist grip opening 44. Then the flexible trim portion 24 is subsequently molded onto the rigid trim portion 22 along an edge of the assist grip opening 44. Alternatively, the flexible trim portion 24 can be bonded to the rigid trim portion 22 by adhesive or the like. In the illustrated embodiment, the flexible trim portion 24 is attached to a curved section of the rigid trim portion 22 with the flexible trim portion 24 also being curved to mate with the assist grip handle 18.

The flexible trim portion 24 is directly attached to the rigid trim portion 22 along an edge of the assist grip opening 44 with the flexible trim portion 24 at least partially covering the assist grip opening 44 of the rigid trim portion 22. The flexible trim portion 24 preferably overlaps the assist grip bezel 26 of the assist grip handle 18. More preferably, the flexible trim portion 24 contacts the assist grip bezel 26 of the assist grip handle 18, and slightly deforms to eliminate the gap that would otherwise exist between the rigid trim portion 22 and the assist grip handle 18. The flexible trim portion 24 has a vehicle interior side that flushly mates with a vehicle interior face of the rigid trim portion 22 at the edge of the assist grip opening 44. The term "flushly mates" as used herein does not require a perfect alignment of the exposed (vehicle interiorly facing) side surfaces at the interface between the edges of the assist grip opening 44 and the flexible trim portion 24. Rather, the term "flushly mates" as used herein allows for the exposed (vehicle interiorly facing) side surfaces to be offset by ±one millimeter. On the other hand, the term "is flush" as used herein requires a perfect visual alignment as viewable with the naked eye of the exposed (vehicle interiorly facing) side surfaces at the interface between the edges of the assist grip opening 44 and the flexible trim portion 24.

In the illustrated embodiment, the flexible trim portion 24 has an assist grip receiving cutout 54 that is configured to receive the assist grip handle 18. The flexible trim portion 24 has a free edge 56 that contacts the assist grip bezel 26 of the assist grip handle 18. The free edge 56 of the flexible trim portion 24 is offset from a free edge 56 of the rigid trim portion 22 that defines the assist grip opening 44. Preferably, the flexible trim portion 24 is a resilient member with a prescribed amount of self-supporting and shape maintaining properties. In other words, when the trim panel 14 is installed on the pillar 16, the free edge 56 of the flexible trim portion 24 will bend and/or compress so as to conform to the shape of the assist grip bezel 26 of the assist grip handle 18 that is contacted by the flexible trim portion 24. Also, when the trim panel 14 is removed from the pillar 16, the flexible trim portion 24 will spring back to its original non-deformed (unstressed) state. In this manner, the trim panel 14 can be repeatedly removed from the pillar 16 and then reinstalled on the pillar 16 without adversely affecting the performance of the flexible trim portion 24 acting as a grip assist gap hider. Thus, this configuration of the trim panel 14 solves the inherent problem that occurs at the interface of mating parts due to part to part variation and assembly tolerances. Also this configuration of the trim panel 14 minimizes undesirable sounds that might otherwise occur by relative movement of the trim panel 14 with respect to the assist grip handle 18 due to vibrations of the vehicle 10.

Figure 5:
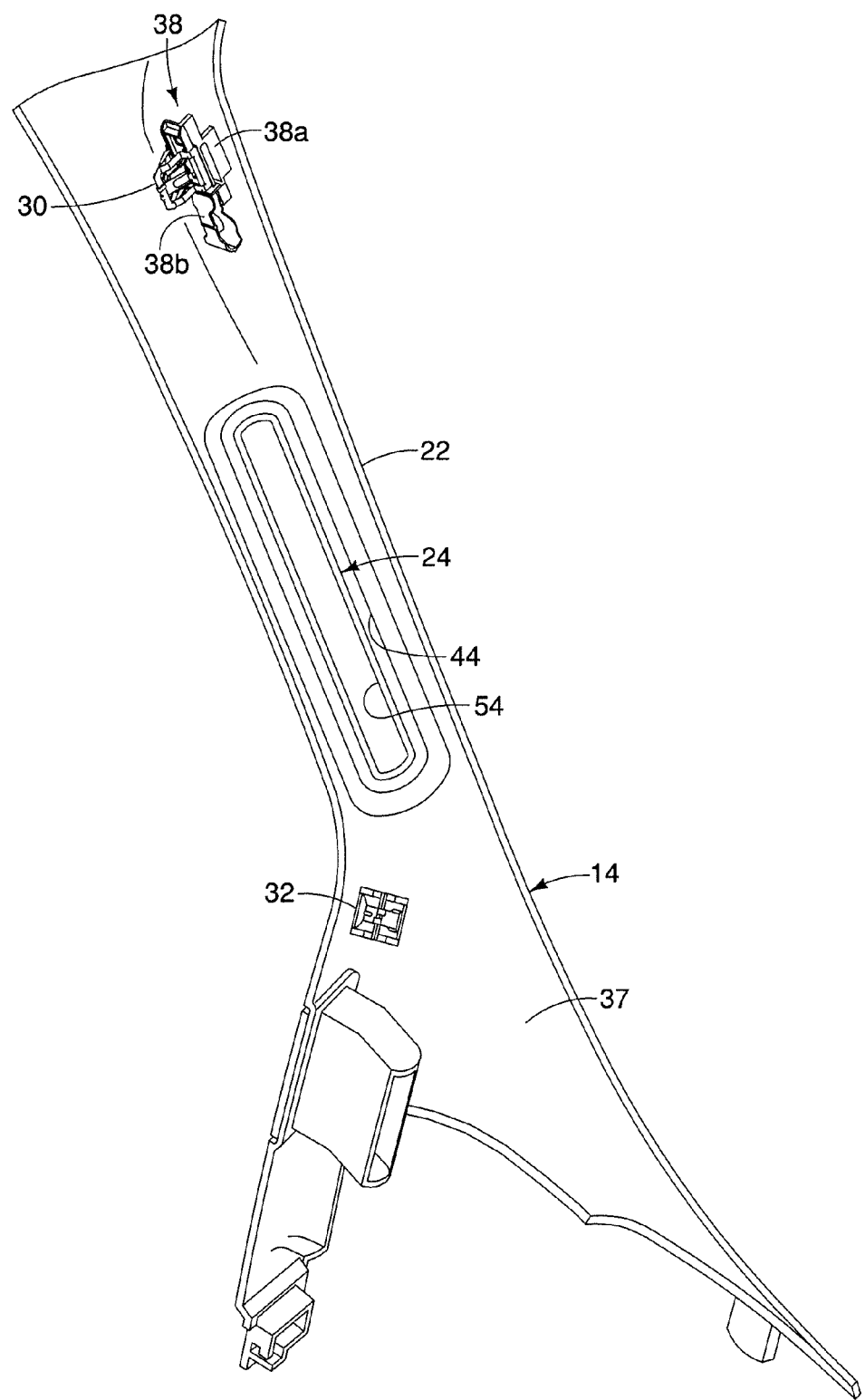
FIG. 5 is an elevational view of the hidden backside surface of the vehicle interior trim panel with the assist grip handle removed.
Figure 6:
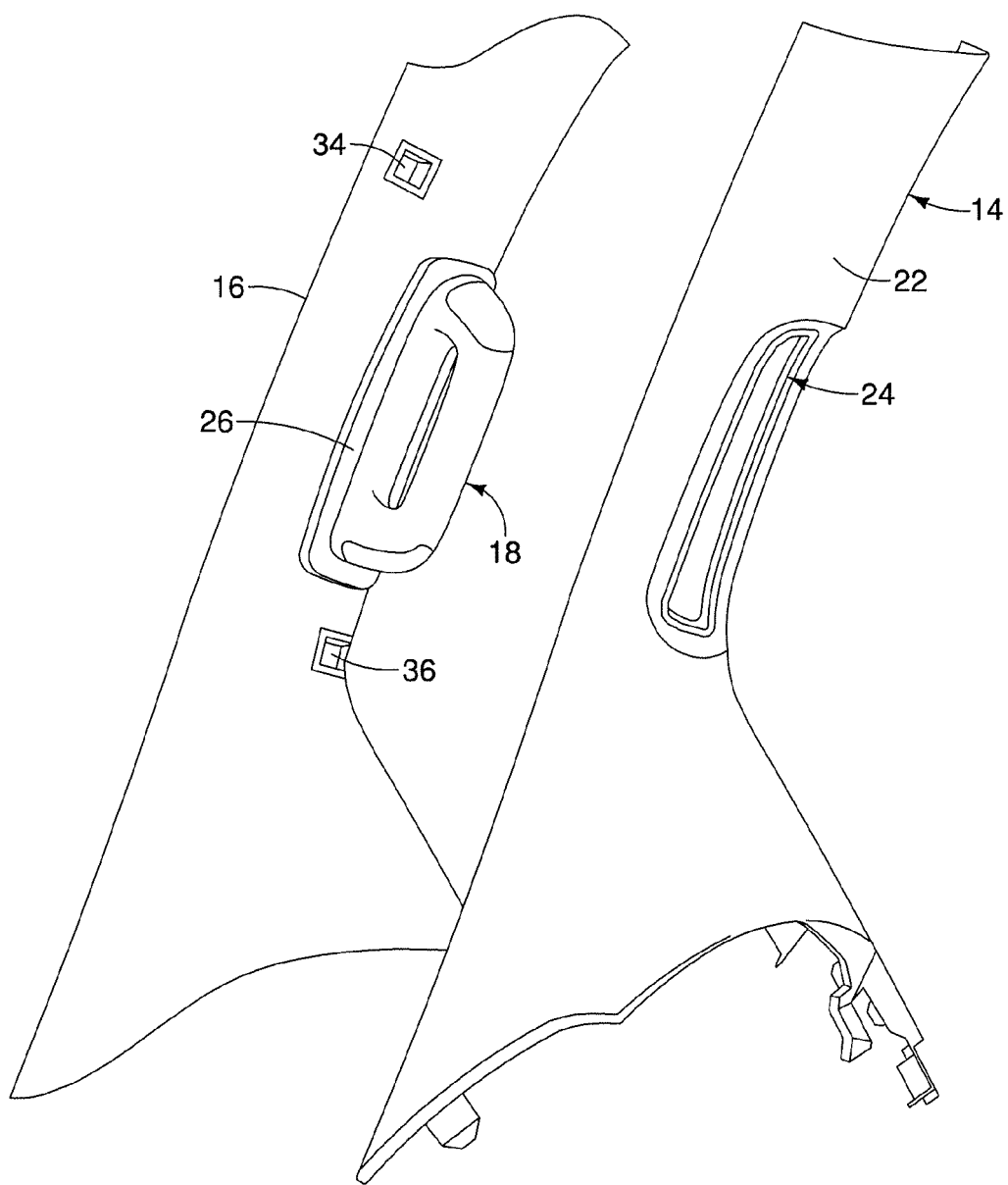
FIG. 6 is an exploded elevational view of the A-pillar of the vehicle with the vehicle interior trim panel and the assist grip handle mounted on the A-pillar of the vehicle.

As seen in FIGS. 5 to 7, the pillar 16 is a structural part of the vehicle body that is made one or more pieces of sheet metal. The precise construction of the pillar 16 will vary from vehicle to vehicle. Thus, the precise construction of the pillar 16 will not be described and/or illustrated in detail herein. In the drawings, the pillar 16 is depicted as an A-pillar of the vehicle 10. Typically, A-pillars are structural portions of a vehicle located between a windshield and a vehicle door. However, it should be understood from the drawings and the description herein that the vehicle body structure 12 can be employed in other areas of the vehicle 10 such as a B-pillar or other area within the vehicle 10 where the assist grip handle 18 could be provided.

In the illustrated embodiment, as seen in FIGS. 7 to 12, in addition to the assist grip bezel 26, the assist grip handle 18 includes a gripping portion 62, a first end portion 64 and a second end portion 66. The gripping portion 62 and the first and second end portions 64 and 66 define a shallow U-shaped member that extends from the assist grip bezel 26. The assist grip handle 18 is formed of a rigid material, such as a hard plastic material. In the illustrated embodiment, the assist grip bezel 26 is integrally formed with the first and second end portions 64 and 66 as a one-piece, unitary member from a suitable material such as polypropylene resins. Of course, it will be apparent to those skilled in the art that the assist grip handle 18 can have other configurations, and thus the assist grip handle 18 will not be discussed and/or illustrated in detail herein.

When the trim panel 14 is installed on the pillar 16, the flexible trim portion 24 will bend and/or compress so as to conform to the surface of the assist grip bezel 26 of the assist grip handle 18. In the illustrated embodiment, the assist grip handle 18 is fixedly secured to the pillar 16 by a pair of fasteners 72 (e.g., two bolts). The fasteners 72 extend through apertures in the first and second end portions 64 and 66 and into respective threaded holes of the pillar 16.

As seen in FIG. 1, the airbag 20 is attached to an upper region of the inner pillar portion 30 in a conventional manner. The airbag 20 is preferably a safety device that is operatively connected in a conventional manner to sensors and/or a control device (not shown) that activates the airbag 20 in response to an impact or collision in a conventional manner. Preferably, the airbag 20 is an air curtain-type device dimensioned such that when deployed in response to vehicle impact, the airbag 20 inflates to a shape similar to an inflatable mattress or the like. As indicated in FIG. 2, once deployed, the airbag 20 takes on a rectangular like-shape forming a protective cushion between a passenger and the door and side window. It should be understood from the drawings and the description herein that the airbag 20 can also be configured to form a protective cushion between the passenger and the inner part of the roof of the vehicle 10. In other words, the specific dimensions and inflated characteristics of the airbag 20 are not limited to those depicted in FIG. 2, but can be specifically chosen depending upon the dimensions and characteristics of the vehicle 10 and requirements of current and proposed safety standards.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle interior trim panel comprising:
a rigid trim portion including an assist grip opening; and
a flexible trim portion fixedly attached to the rigid trim portion as an integral unit along an edge of the assist grip opening with the flexible trim portion at least partially covering the assist grip opening of the rigid trim portion such that the flexible trim portion and rigid trim portion are integrally separable from a vehicle pillar.

2. The vehicle interior trim panel according to claim 1, wherein
the rigid trim portion has an overall peripheral configuration of a pillar trim panel that covers the vehicle pillar.

3. The vehicle interior trim panel according to claim 1, wherein
the rigid trim portion completely surrounds the assist grip opening with the edge of the assist grip opening being a continuous annular edge.

4. The vehicle interior trim panel according to claim 3, wherein
the edge of the assist grip opening is an elongated aperture.

5. The vehicle interior trim panel according to claim 1, wherein
the flexible trim portion is molded onto the rigid trim portion.

6. The vehicle interior trim panel according to claim 1, wherein the flexible trim portion has a vehicle interior side that flushly mates with a vehicle interior side of the rigid trim portion at the edge of the assist grip opening.

7. The vehicle interior trim panel according to claim 1, wherein
the flexible trim portion is directly attached on the edge of the assist grip opening.

8. The vehicle interior trim panel according to claim 1, wherein
the flexible trim portion is formed of an elastomer.

9. The vehicle interior trim panel according to claim 1, wherein
the rigid trim portion is formed of a polypropylene.

10. The vehicle interior trim panel according to claim 1, wherein
a portion of the flexible trim portion has an arcuate cross sectional shape.

11. The vehicle interior trim panel according to claim 1, wherein
the flexible trim portion is attached to the rigid trim portion by adhesive.

12. A vehicle body structure comprising:
a structural vehicle body section;
an assist grip handle fixedly secured to the structural vehicle body section;
a vehicle interior trim panel releasably secured to the structural vehicle body section, the vehicle interior trim panel including
a rigid trim portion including an assist grip opening with the assist grip handle projecting through the assist grip opening, and
a flexible trim portion fixedly attached to the rigid trim portion as an integral unit along an edge of the assist grip opening with the flexible trim portion at least partially covering the assist grip opening of the rigid trim portion such that the flexible trim portion and rigid trim portion are integrally separable from a vehicle pillar, and the flexible trim portion overlying a portion of the assist grip handle.

13. The vehicle body structure according to claim 12, further comprising
an airbag disposed between the vehicle interior trim panel and the structural vehicle body section.

14. The vehicle body structure according to claim 12, wherein
the structural vehicle body section is a portion of the vehicle pillar with the rigid trim portion being a pillar trim panel that covers the vehicle pillar.

15. The vehicle body structure according to claim 12, wherein
the rigid trim portion completely surrounds the assist grip opening with the edge of the assist grip opening being a continuous annular edge.

16. The vehicle body structure according to claim 15, wherein
the edge of the assist grip opening is an elongated aperture.

17. The vehicle body structure according to claim 12, wherein
the flexible trim portion is molded onto the rigid trim portion.

18. The vehicle body structure according to claim 12, wherein
the flexible trim portion has a vehicle interior side that flushly mates with a vehicle interior side of the rigid trim portion at the edge of the assist grip opening.

19. The vehicle body structure according to claim 12, wherein
the flexible trim portion is directly attached on the edge of the assist grip opening.

20. The vehicle body structure according to claim 12, wherein
the flexible trim portion is formed of an elastomer.

21. The vehicle body structure according to claim 12, wherein
the rigid trim portion is formed of a polypropylene.

22. The vehicle body structure according to claim 12, wherein
the flexible trim portion contacts the assist grip handle.

23. The vehicle body structure according to claim 12, wherein
a distal end of the flexible trim portion contacts the assist grip handle, the distal end being away from an end of the flexible trim portion that is fixedly attached to the rigid trim portion.

24. The vehicle body structure according to claim 12, wherein a portion of the flexible trim portion has an arcuate cross sectional shape.

25. The vehicle body structure according to claim 12, further comprising
a bezel extending around the assist grip handle.

26. The vehicle body structure according to claim 25, wherein
a width of the bezel is smaller than a width of the assist grip opening in the rigid trim portion.

27. The vehicle body structure according to claim 25, wherein the bezel has a planar main portion.

28. The vehicle body structure according to claim 25, wherein
the bezel is located between the assist grip handle and the structural vehicle body section.

29. The vehicle body structure according to claim 28, wherein
the bezel is disposed between the rigid trim portion and the structural vehicle body section.

30. The vehicle body structure according to claim 25, wherein
a portion of the flexible trim portion contacts the bezel.

31. The vehicle body structure according to claim 30, wherein
the portion of the flexible trim portion has an arcuate cross sectional shape.

32. The vehicle body structure according to claim 25, wherein
a distal end of the flexible trim portion contacts the bezel, the distal end being away from an end of the flexible trim portion that is fixedly attached to the rigid trim portion.

* * * * *